Nov. 23, 1943.                J. P. JOHNSON                2,334,877
                                 COUPLING
                           Filed April 4, 1941
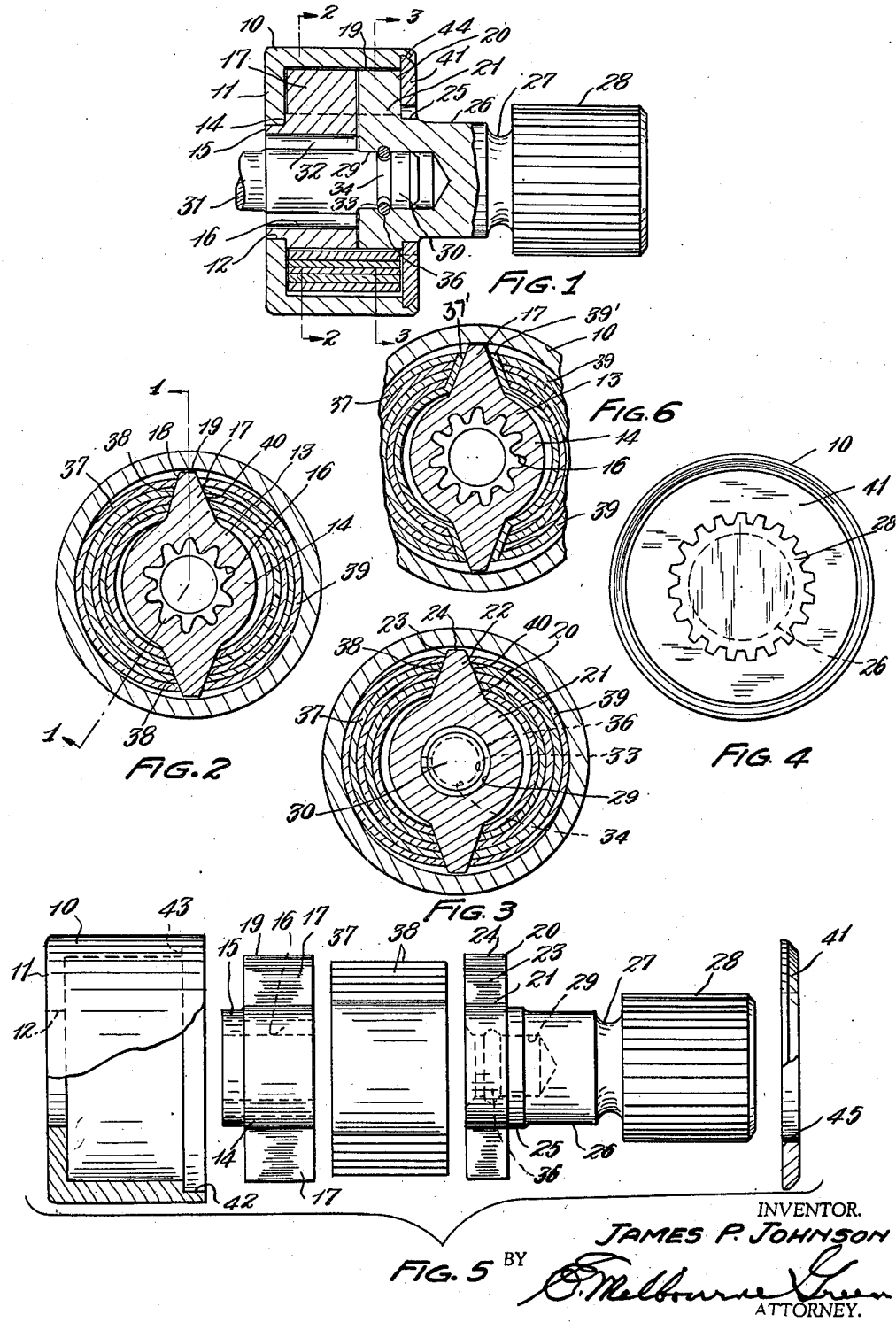
INVENTOR.
JAMES P. JOHNSON
BY
ATTORNEY.

Patented Nov. 23, 1943

2,334,877

UNITED STATES PATENT OFFICE 2,334,877

COUPLING

James P. Johnson, Shaker Heights, Ohio

Application April 4, 1941, Serial No. 386,773

8 Claims. (Cl. 64—27)

This invention relates to couplings and has for its primary object to provide a flexible coupling unit of improved construction adapted to drivingly connect a drive member and a driven member in such a manner that impulses and vibrations ordinarily transmitted therebetween are effectively absorbed to such an extent that fatigue is eliminated or materially reduced as well as breakage ordinarily due to crystallization of the elements.

Another object of the present invention is to provide a coupling of the type referred to which is especially adaptable for operatively connecting rotatable drive and driven members and constructed for operation in either direction of rotation with equal efficiency without necessitating removability or reversibility of parts.

Another object of the present invention is to provide the resilient units structurally similar so as to afford interchangeability and thus simplify production.

Another object of the present invention is to provide a flexible coupling unit which is simple in construction, efficient in operation, and inexpensive to manufacture and assemble.

With the objects above indicated, and other objects hereinafter explained in view, my invention consists in the construction and combination of elements hereinafter described and claimed.

Referring to the drawing,

Figure 1 is a longitudinal vertical sectional view taken substantially along line 1—1 in Figure 2 and showing a coupling embodying the present invention.

Figure 2 is a transverse sectional view taken on line 2—2 in Figure 1 and showing the normal relationship between the driven member and resilient means.

Figure 3 is a transverse sectional view taken along line 3—3 in Figure 1 and showing the normal relationship between the drive member and the resilient means.

Figure 4 is an end elevational view looking at the pinion end.

Figure 5 is a longitudinal side elevational view with the elements in extended spaced relation in their manner of assembly the parts being illustrated in double size.

Figure 6 is a fragmentary transverse sectional view similar to Figure 2 but showing a modification embodying the invention.

In the drawing I have illustrated a flexible coupling embodying the present invention and while particularly designed for use in connection with vacuum pumps for aircraft, it will be obvious that the coupling may be otherwise adapted under conditions where similar results are desired.

The coupling is preferably a self-contained unit which comprises a housing 10, of steel or other suitable material, and of tubular form, one end of which is closed by an integral transversely extending end wall 11 having an axial opening 12 provided therein for a purpose to be later described. A driven member 13, of steel or other suitable material, has a central hub portion 14 disposed within the housing and engageable with the inner adjacent face of the end wall 11, the hub portion being provided with an outwardly projecting annular extension 15 mounted for oscillatory movement in the adjacent opening 12 as more clearly shown in Figure 1. The hub portion 14 and extension 15 are provided with internal splines 16 which extend longitudinally throughout their respective lengths as more clearly shown in Figure 2. The driven member 13 is further provided with integral lugs 17 projecting outwardly on diametrically opposite sides of the hub portion and coextensive in relative length. The side faces 18 of the lugs are tapered outwardly along converging planes and terminate in a transverse flat end 19 spaced slightly inwardly from the inner peripheral wall of the housing as more clearly shown in Figure 2.

A drive member 20, of steel or other suitable material, is likewise provided with a central hub portion 21 preferably of the same diameter as the hub portion 14 and is rotatably disposed within the housing in axial alignment with the hub portion 14. The drive member is, likewise, provided with integral lugs 22 projecting outwardly on diametrically opposite sides of the hub portion and coextensive in relative length. The lugs 22 also have tapered side faces 23 extending outwardly along converging planes and terminating in a transverse flat end 24 spaced slightly from the inner peripheral wall of the housing. The lugs 17 and 22 on the respective members are of the same relative size and shape being normally disposed in longitudinal alignment but relatively movable independently in opposite directions about their common axis. Preferably the longitudinal lengths of the lugs are different as shown in Figure 1 thus having certain desirable features but this relationship may be varied at will even up to the point where they are of equal lengths. The drive member 20 is further provided with a relatively short integral extension 25 projecting axially outwardly from the hub 21 and a relatively longer integral extension 26, of slightly smaller diameter, integrally connected to a pinion 28 of suitable diameter. Adjacent the inner end of the pinion a shear portion 27 is provided in any desirable manner but preferably by forming a peripheral groove of reduced cross-sectional area to afford breaking point in the event of mechanical overload in the system. The pinion 28 is adapted for driving connection with any suitable power source such as the aircraft engine or the like. The hub portion 21, of the drive member, is provided with a counterbore 29 extending axially inwardly from the inner face of the hub and of suitable diameter to pivotally pilot the end 30 of a pump shaft 31. Adjacent its free end the pump shaft 31 is provided with outwardly projecting splines 32 adapted for cooperative engagement with the splines 16 on the driven member to insure relative unitary movement therebetween. The pump shaft is suitably maintained in operative position by means of a snap ring 33 which normally fits within a circumferential groove 34 formed adjacent the outer end of the shaft and adapted, upon being released, to cooperatively project into a groove 36 formed on the inner peripheral wall of the counterbore.

Any suitable means for effecting a flexible drive between the drive member 20 and driven member 13 may be adopted but a simple and highly efficient means is illustrated in the drawing. A plurality of relatively thin semi-circular springs 37, of spring steel material, are arranged relatively in concentrically nested relation and eccentrically disposed in the housing on one side of diametrically opposite lugs, as more clearly shown in Figures 2 and 3. The springs 37 are, in length, coextensive with the overall length of the adjacent lugs on the drive and driven members and the outer central portion of the outer spring abuts the adjacent portion of the inner peripheral wall of the housing to afford a stop. The free ends 38, of the springs, are tapered or beveled to conform with the adjacent faces of the lugs with which they are engageable. A plurality of springs 39, of identical size and relative arrangement, are disposed in the housing diametrically opposite to the springs 37 and have their free ends 40 tapered or beveled to conform with the adjacent faces of the lugs with which they engage. The outer central portion of the outer spring, likewise, abuts the adjacent portion of the inner peripheral wall of the housing to afford a stop in a manner to be later described. The spring clusters are of identical size and relative disposition and are, therefore, interchangeable as a unit or the same size spring in different clusters may be interchanged. While five of such springs are illustrated any other number may be employed. The spring clusters further may be slightly pre-loaded before insertion by forming the springs of such arcuate lengths that their ends must be separated relatively to permit insertion. With the springs arranged as described, relative angular movement of the driven member with respect to the drive member about their axis causes the adjacent ends of one of the spring clusters to yield under force while the opposite ends of the same cluster is prevented from similar movement by the relatively stationary lug on the adjacent drive member. At the same time the opposite ends of the other spring cluster is forced outwardly by movement of the driven member while its opposite ends is maintained relatively stationary by the adjacent lug on the drive member. The reverse action takes place when the drive and driven members operate in a reverse direction thereby providing a flexible drive capable of operation in either direction of rotation without the necessity of replacement of parts or reversal of the elements. In the event that the springs of either cluster or both should become broken or otherwise lose their resiliency a positive drive is afforded when the lugs on the drive and driven member have reached their maximum separation in which case the springs are compressed into a solitary unit.

If it is found that, under continual operation, the tapered faces of the lugs become undesirably pitted or gouged out due to driving engagement effected through the adjacent ends of the springs, the innermost spring of each cluster 37 and 39 may be provided with outwardly projecting integral extensions 37' and 39' respectively disposed in abutting relation with the adjacent faces of the lugs and on diametrically opposite sides as more clearly shown in Figure 6. The free ends of the remaining springs of each cluster are suitably shortened so as to abut the outer adjacent faces of the extensions thereby preventing their engagement with the faces of the lugs but functioning in the manner before described.

When the drive and driven members and their respective spring clusters have been inserted in the housing in the manner heretofore described, a cover member 41 of suitable material is disposed in a bore 42 provided on the open end of the housing 10 and seats against a shoulder 43 in such a position as to slidably engage the adjacent annular face of the hub and lugs on the drive member. To secure the cover member 41 in place the outer end 44 of the housing is spun over into engagement with the cover to rigidly secure the latter against accidental displacement. The cover member has an axial opening 45 of sufficient size and shape to afford ready sliding over the pinion 28 during assembly.

In operation, the coupling is connected to the vacuum pump rotor, in the manner heretofore described, and the pinion is drivingly connected with a power source such as the aircraft engine. Impulses and vibrations ordinarily transmitted from the engine are effectively absorbed or materially reduced by the yieldability of the spring clusters upon relative angular movement of the drive and driven members. The arrangement of the elements is such that the coupling efficiently operates irrespective of the direction of rotation of the drive means thus eliminating the objectionable characteristic found in other types of couplings of requiring removal or reversal of the operating elements. The coupling further has the desired characteristic of affording a positive mechanical drive in the event of injury or breakage of the springs.

While I have described the preferred embodiment of the invention it is to be understood that I am not to be limited thereto inasmuch as changes and modifications may be resorted to without departing from the spirit of the invention as defined in the appended claims.

What is claimed is:

1. A flexible coupling comprising: a rotatable drive member; a rotatable driven member adapted for unitary rotation in the same direction with said drive member; said members having a limited amount of relative angular movement about their axis of rotation; and flexible means operatively connecting said members together for unitary rotation including, outwardly bowed resilient members disposed on diametrically opposite sides of said drive and driven members and having their free adjacent ends spaced apart relatively; means operatively associated with the outer central portions of said bowed members for maintaining the latter in relatively fixed relation; and lugs on diametrically opposite sides of both said drive and driven members, the diametrically opposite lugs on one member being normally in longitudinal alignment with the diametrically opposite lugs on the other member, the diametrically opposite lugs on both members projecting outwardly between the adjacent spaced ends of said bowed members for engagement therewith thus effecting a yieldable driving connection between said drive and driven members regardless of the direction of rotation.

2. A flexible coupling comprising: a rotatable drive member; a rotatable driven member adapted for unitary rotation in the same direction with said drive member; said members having a limited amount of relative angular movement about their axis of rotation; and flexible means operatively connecting said members together for unitary rotation including, outwardly bowed resilient members disposed on diametrically opposite sides of said drive and driven members and having their free adjacent ends spaced apart relatively; means operatively associated with the outer central portions of said bowed members for maintaining the latter in relatively fixed relation; and lugs on diametrically opposite sides of both said drive and driven members, the diametrically opposite lugs on one member being normally in longitudinal alignment with the diametrically opposite lugs on the other member, the diametrically opposite lugs on both members projecting outwardly between the adjacent spaced ends of said bowed members for engagement therewith, the engaging portions being formed with complimentary faces, thus effecting a yieldable driving connection between said drive and driven members regardless of the direction of rotation.

3. A flexible coupling comprising: a rotatable drive member; a rotatable driven member adapted for unitary rotation in the same direction with said drive member; said members having a limited amount of relative angular movement about their axis of rotation; and flexible means operatively connecting said members together for unitary rotation including, resilient elements each comprising a plurality of substantially semi-circular springs arranged relatively in concentric nested relation and said elements being eccentrically disposed on diametrically opposite sides of said drive and driven members with their free adjacent ends spaced apart relatively; means operatively associated with the outer central portions of said springs for maintaining the latter in relatively fixed relation; and lugs on diametrically opposite sides of both said drive and driven members, the diametrically opposite lugs on one member being normally in longitudinal alignment with the diametrically opposite lugs on the other member, the diametrically opposite lugs on both members projecting outwardly between the adjacent spaced ends of said springs for engagement therewith thus effecting a yieldable driving connection between said drive and driven members regardless of the direction of rotation.

4. A flexible coupling comprising: a rotatable drive member; a rotatable driven member adapted for unitary rotation in the same direction with said drive member; said members having a limited amount of relative angular movement about their axis of rotation; and flexible means operatively connecting said members together for unitary rotation including, resilient elements each comprising a plurality of substantially semi-circular springs arranged relatively in concentric nested relation and said elements being eccentrically disposed on diametrically opposite sides of said drive and driven members with their free adjacent ends spaced apart relatively; means operatively associated with the outer central portions of said springs for maintaining the latter in relatively fixed relation; and lugs on diametrically opposite sides of both said drive and driven members, the diametrically opposite lugs on one member being normally in longitudinal alignment with the diametrically opposite lugs on the other member, the diametrically opposite lugs on both members projecting outwardly between the adjacent spaced ends of said springs for engagement therewith, the engaging portions being formed with complementary faces, thus effecting a yieldable driving connection between said drive and driven members regardless of the direction of rotation.

5. A flexible coupling comprising: a housing having a bore extending inwardly from one end thereof terminating adjacent a transverse end wall; a drive member mounted for oscillatory movement in said housing and having lugs on diametrically opposite sides projecting outwardly into said bore; a driven member mounted for oscillatory movement in said housing and in axial alignment with said drive member in a manner to afford limited angular relative movement, said driven member having lugs on diametrically opposite sides projecting outwardly into said bore, the adjacent lugs on said drive and driven members being normally in longitudinal alignment; and outwardly bowed resilient members disposed on diametrically opposite sides of said drive and driven members and having their free ends engageable with the adjacent lugs while their outer central portions are engageable with the adjacent inner peripheral portion of said bore for effecting a yieldable but unitary driving connection between said drive and driven members.

6. A flexible coupling comprising: a housing having a bore extending inwardly from one end thereof terminating adjacent a transverse end wall; a drive member mounted for oscillatory movement in said housing and having lugs on diametrically opposite sides projecting outwardly into said bore; a driven member mounted for oscillatory movement in said housing and in axial alignment with said drive member in a manner to afford limited angular relative movement, said driven member having lugs on diametrically opposite sides projecting outwardly into said bore, the adjacent lugs on said drive and driven members being normally in longitudinal alignment; and resilient elements each comprising a plurality of substantially semi-circular springs arranged relatively in concentric nested relation and said elements being eccentrically disposed on diametrically opposite sides of said drive and driven members with their free ends engageable with the adjacent lugs while their outer central portions are engageable with the adjacent inner peripheral portion of said bore for effecting a yieldable but unitary driving connection between said drive and driven members.

7. A flexible coupling comprising: a housing having a bore extending inwardly from one end thereof terminating adjacent a transverse end wall provided with an axial opening; a cover plate secured to the open end of said housing and having an axial opening therein; a drive member mounted for oscillatory movement in the axial opening in said end wall and having lugs on diametrically opposite sides projecting outwardly into said bore; a driven member mounted for oscillatory movement in the axial opening in said cover member and having lugs on diametrically opposite sides projecting outwardly into said bore, the adjacent lugs on said drive and driven members being in longitudinal alignment; and outwardly bowed resilient members disposed on diametrically opposite sides of said drive and driven members and having their free ends engageable with the adjacent lugs while their outer central portions are engageable with the adjacent inner peripheral portion of said bore for effecting a yieldable but unitary driving connection between said drive and driven members.

8. A flexible coupling comprising: a rotatable drive member; a rotatable driven member adapted for unitary rotation in the same direction with said drive members; said members having a limited amount of relative angular movement about their axis of rotation; and flexible means operatively connecting said members together for unitary rotation including, resilient elements each comprising a plurality of semi-circular springs arranged relatively in concentric nested relation and said elements being eccentrically disposed on diametrically opposite sides of said drive and driven members with their free adjacent ends spaced apart relatively; the inner spring of each resilient element having outwardly projecting integral extensions on diametrically opposite ends disposed for engagement with the adjacent ends of the other springs; means operatively associated with the outer central portions of said springs for maintaining the latter in relatively fixed relation; and lugs on diametrically opposite sides of both said drive and driven member, the lugs on one member being in longitudinal alignment with the lugs on the other member and projecting outwardly between the adjacent spaced extensions for engagement therewith thus effecting a yieldable driving connection between said drive and driven members regardless of the direction of rotation.

JAMES P. JOHNSON.